United States Patent [19]

Nakamoto

[11] 4,206,617
[45] Jun. 10, 1980

[54] RING FOR MOUNTING A ROTARY BODY TO A SHAFT

[75] Inventor: Takayuki Nakamoto, Tokyo, Japan

[73] Assignee: Iwata Electric Works Co., Ltd., Tokyo, Japan

[21] Appl. No.: 937,731

[22] Filed: Aug. 29, 1978

[30] Foreign Application Priority Data

Apr. 6, 1978 [JP] Japan .................. 53-40899

[51] Int. Cl.² ........................ F16D 3/79
[52] U.S. Cl. ........................ 64/13; 64/15 B; 64/22
[58] Field of Search ............. 64/13, 15 B, 22, 27 L

[56] References Cited

U.S. PATENT DOCUMENTS

| | | | |
|---|---|---|---|
| 134,673 | 1/1873 | John | 64/15 B |
| 1,266,609 | 5/1918 | Mills | 64/15 B |
| 1,573,961 | 2/1926 | Zucker | 64/13 |
| 2,249,292 | 7/1941 | Kapitza | 64/22 |
| 2,855,767 | 10/1958 | Ahlen | 64/13 |
| 3,677,031 | 7/1972 | Zierak et al. | 64/13 |
| 3,864,940 | 2/1975 | Black | 64/13 |
| 4,077,236 | 3/1978 | Dalziel | 64/15 B |

FOREIGN PATENT DOCUMENTS

| | | | |
|---|---|---|---|
| 2232206 | 1/1973 | Fed. Rep. of Germany | 64/13 |
| 489318 | 1/1919 | France | 64/13 |
| 70946 | 11/1915 | Switzerland | 64/13 |
| 319693 | 4/1957 | Switzerland | 64/13 |

*Primary Examiner*—Ira S. Lazarus
*Attorney, Agent, or Firm*—Birch, Stewart, Kolasch & Birch

[57] ABSTRACT

A ring member which is adapted to be disposed in an opening of a rotary member for coaxially mounting said rotary member to a shaft member which comprises a substantially convex ring body containing a centrally disposed hole, said ring body containing a plurality of outet slits which extend radially inwardly from the outer peripheral edge of the ring body toward the centrally disposed hole, a plurality of inner slits which radially extend outwardly from the edge defining the centrally disposed hole toward the outer peripheral edge of the ring body, and a plurality of through holes disposed in said ring body, said through holes being adapted to receive connecting rods for mounting the rotary member to said shaft member.

16 Claims, 12 Drawing Figures

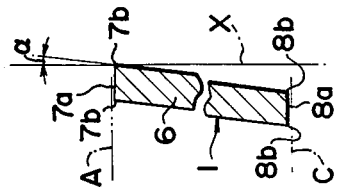
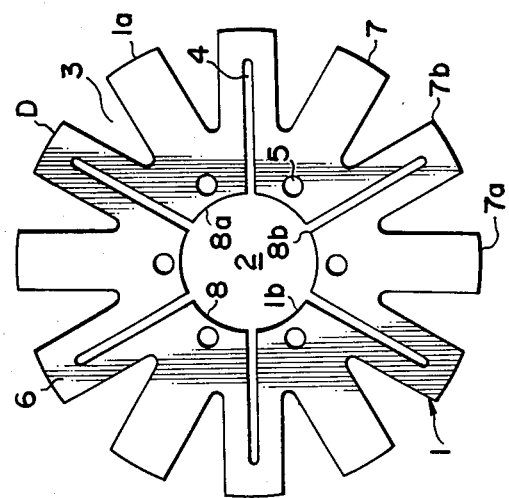
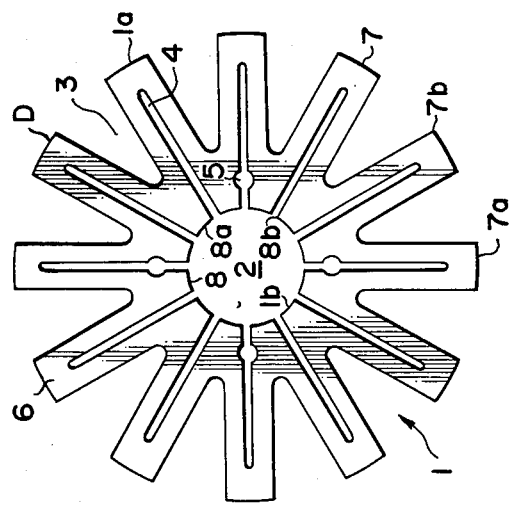
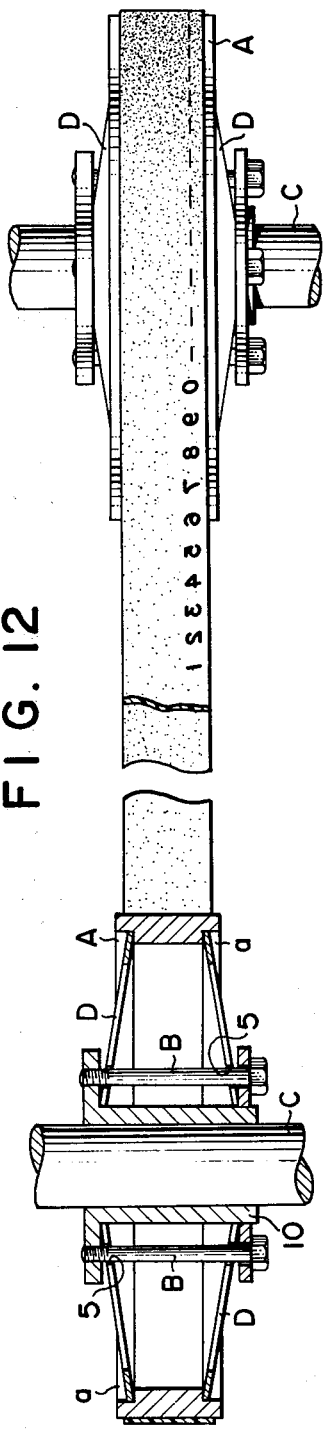

RING FOR MOUNTING A ROTARY BODY TO A SHAFT

BACKGROUND AND SUMMARY OF THE INVENTION

The present invention relates to a ring for mounting a rotary member such as a drum, an idle pulley, a cylindrical gear, or a type drum used in a facsimile equipment, a copying machine, a printer, a printing machine, a pen recorder, an X-Y plotter, or a computer, to a shaft.

An object of the present invention is to provide a ring which can rapidly and reliably mount a rotary member to a shaft and which can perform a precise centering operation of the rotary member on the shaft.

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

FIG. 3 to FIG. 6 are elevational views of a ring according to different embodiments of the invention;

FIG. 7 is an enlarged sectional view of a main part of FIG. 2;

FIG. 8 to FIG. 12 are views showing rings shown in their operational positions in which they are adapted to mount rotary members to shafts.

DETAILED DESCRIPTION OF THE INVENTION

Figure 1:
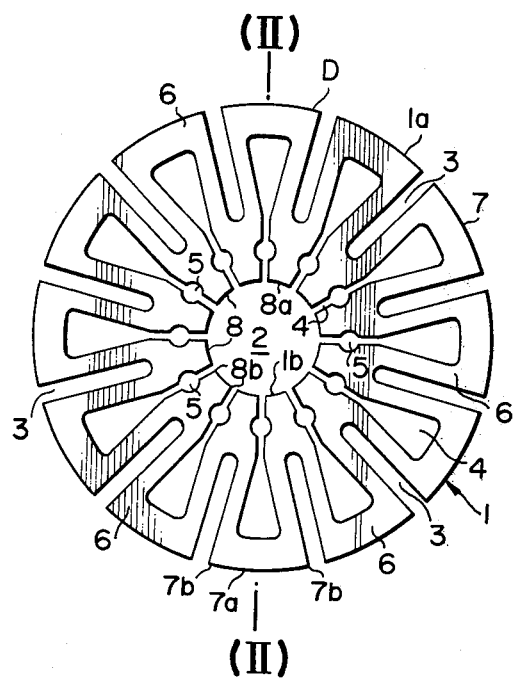
FIG. 1 is an elevational view of a ring according to an embodiment of the invention.
Figure 2:
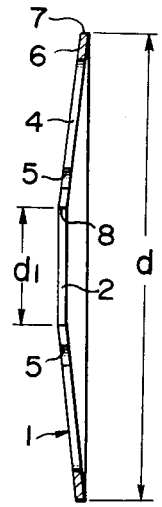
FIG. 2 is a longitudinal sectional view taken along the line II—II of FIG. 1.

A ring D is adapted to mount a rotary member A to a shaft C in such a way that the rings are placed in openings a of the rotary member A and are drawn close to one another by connecting rods B. The body 1 of the ring D is made of a hard metal having the elasticity of a steel or a synthetic resin.

The outer diameter d of the ring D is substantially equal to and is preferably slightly less than the inner diameter of stepped abutment portions 9 provided in the openings a of the rotary member A. The diameter of $d_1$ of a center hole 2 of the ring is substantially equal to and is preferably slightly larger than the diameter of the shaft C or of the cylindrical portion of the sleeve 10. The ring D is in the form of a convex plate and is provided with outer radial slits 3 which extend inward from the outer periphery 1a and with inner radial slits 4 which extend outward from the periphery 1b of the center hole 2. These slits are equiangularly arranged in radial directions and are separated from one another to provide actuating projections 6 along lines which are in a vertical plane and pass the center point of the hole 2. The ring body 1 is provided with holes 5 in the neighborhood of the center hole 2 and along the periphery 1b, through which connecting rods pass. In practice, the through holes 5 can be made by partially cutting the opposite side edges of the slits 4 by a drilling operation.

The actuating projections 6 of the ring body 1 are provided on the edges of the periphery 1a with outer claws 7 which are disengageably fitted in the stepped abutment portion 9 of the rotary member A, and are provided, on the inner end edge defining the center hole 2, with inner claws 8 which are disengageably mounted to the shaft C or the sleeves 10. The end faces 7a of the outer claws 7 and the end faces 8a of the inner claws 8 are parallel to one another and are perpendicular to a standard plane X including lines extending between the edges of outer periphery 1a. The end faces 7a and 8a are precisely ground to increase the accuracy of centering the ring. Further, the corner portions 7b and 8b, which continuously connect the end faces 7a, 8a, to the faces of the actuating projections 6 are angled with no roundness.

The inclined angle $\alpha$ of the projections 6 is within a range of approximately 5 to 20 degrees, and preferably of 9 to 15 degrees, with respect to the standard plane X. The inclined angle $\alpha$ ensures that the actuating projections are moved from an inclined position in such a way that the diameter d is increased and the diameter $d_1$ is decreased so as to secure the rotary member A directly or via the sleeves 10 to the shaft C.

In the embodiments shown in FIGS. 8 to 11, the rotary member A is in the form of a drum. The rings d are positioned in opposite opening a, a of the rotary drum and are drawn close to one another by means of the connecting rods B which pass through the holes 5 of the rings D so that the rotary drum A can be mounted directly or through the sleeves 10, to the shaft C.

Figure 8:
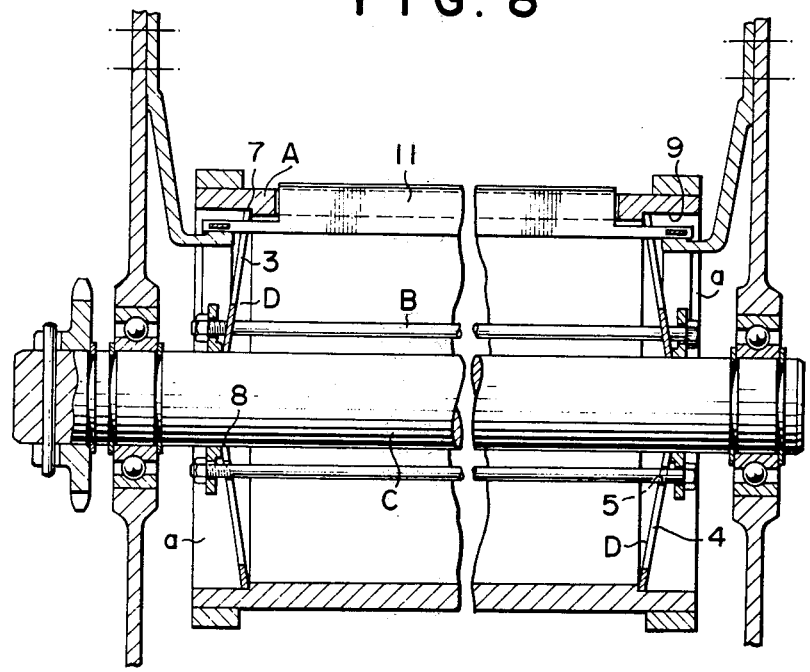
Figure 9:
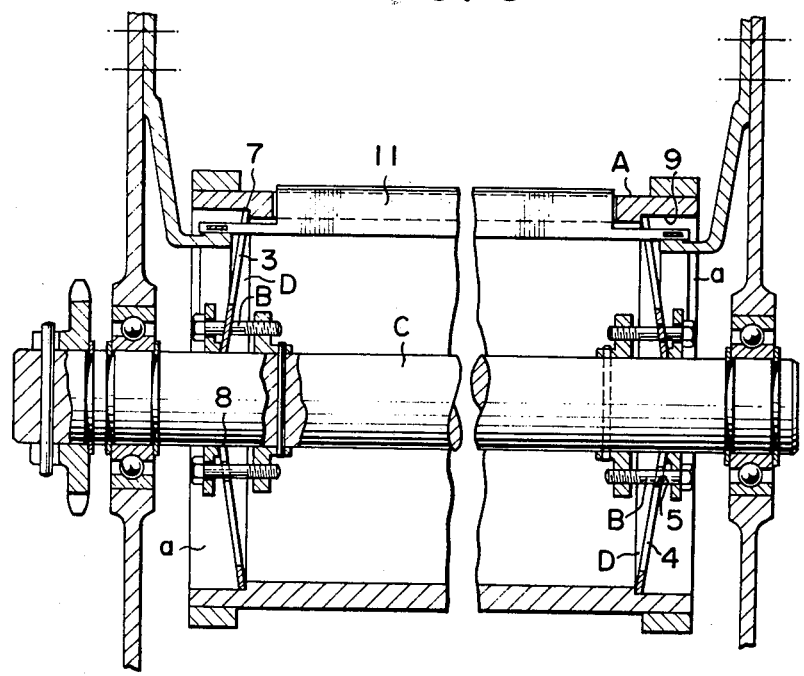
Figure 10:
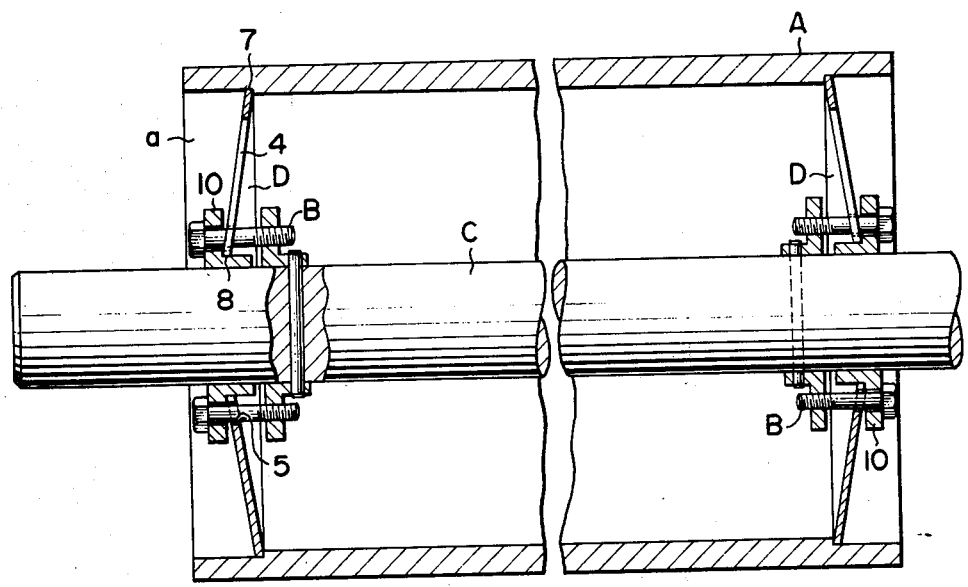
Figure 11:
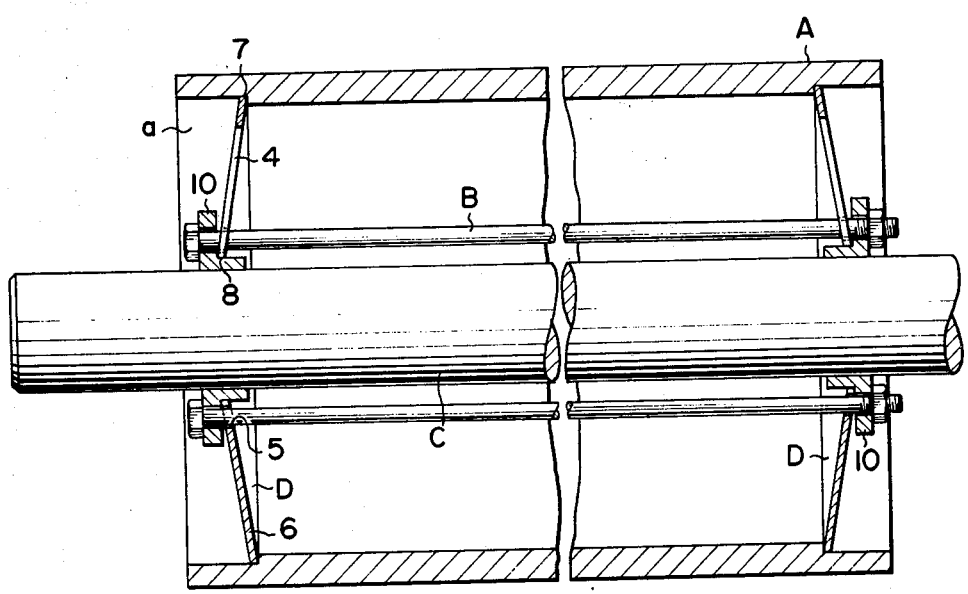

In particular, the embodiment shown in FIGS. 8 and 9 is superior in accuracy of centering to that shown in FIGS. 10 and 11 which include additional sleeves 10 between the ring D and the shaft C, since the outer claws 7 of the projections 6 and the inner claws 8 are directly engaged by the stepped abutment portions 9 and the shaft C, respectively.

In FIGS. 8 and 11, since the connecting rods B extend between both rings D, the rings D can be simultaneously drawn close to one another.

In FIGS. 9 and 10, since the connecting rods B are individually inserted in the corresponding through holes 5 of the rings D, the inserting operation can be easily effected in comparison with FIGS. 8 and 11 in which the connecting rods extend from the holes 5 of one ring to the holes 5 of another ring.

In FIGS. 8 to 11, the rotary drum A is rigidly connected to the shaft C by means of the ring D so that the drum can rotate together with the shaft, whereas in FIG. 11, the rotary drum A is rotatably mounted to the shaft C by means of the ring D.

FIG. 12 shows a rotary member A which is in the form of an idle pulley used in a printer. The rings D are placed in openings a, a of the idle pulleys A, A between which a belt ring with letters or characters is arranged. The rings D are drawn close to one another by means of connecting rods B passing through the holes 5 of the rings D so that the idle pulleys A, A are mounted to the shaft C via the sleeves 10.

The ring D shown in FIG. 1 is provided with outer slits 3 and inner slits 4 both having a small width. The ring D is also provided with fan-shaped actuating projections 6 disposed close to one another. Therefore, it is possible to construct ring D in such a way that the widths of the end faces 7a and 8a of the outer claws 7 and the inner claws 8 is larger than those of the slitss 3 and 4, respectively. This results in an increase in the contact area between the rotary member A and the shaft C and an effective transmission of the torque of the shaft C to the rotary member A without any loss. Further, due to a uniform pressure acting on the periphery of the rotary member A, no deformation of the latter occurs and a highly precise centering of the shaft can be provided. Furthermore, since the hole 5 is formed in each of the inner slits 4, a certain number of connecting rods B can be optionally inserted in the holes, so that the rotary member A can be rapidly, effectively, and easily mounted to the shaft.

Figure 3:
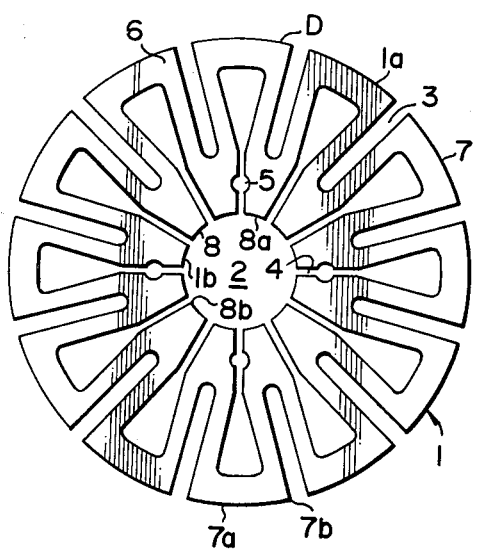

The ring D shown in FIG. 3 is the same as that shown in FIG. 1, with the exception of the arrangement of the holes 5. Therefore, the ring D shown in FIG. 3 also has the advantages of an effective transmission of the rotational torque of the shaft and a highly precise centering of the shaft, similarly to the ring shown in FIG. 1. In addition, since the four holes 5 are arranged correspondingly to the connecting rods B in such a way that the actuating projections 6 having the holes 5 and the actuating projections 6 having no hole are alternatively arranged and the projections 6 with no hole are equiangularly positioned in four directions, the rigidity of the ring D and the pressure of the ring acting on the shaft is increased, resulting in a further increase in the transmissibility of the rotating torque of the shaft.

Figure 4:
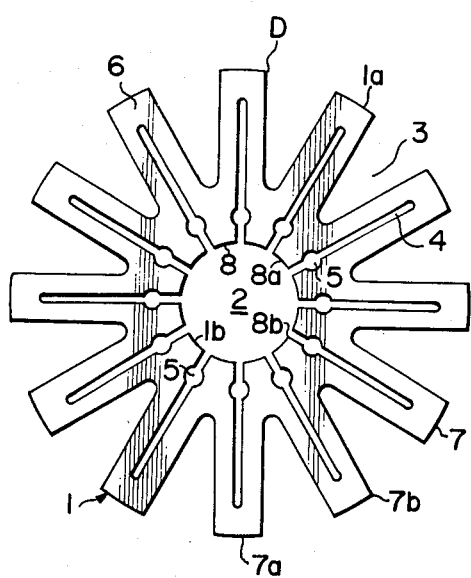

The ring D shown in FIG. 4 includes inner slits 4 having small widths and outer slits 3 having a V-shaped profile, the width of which is progressively increased in the outward direction. The width of the slits 3 at the open end is larger than that of the projection 6. The hole 5 is provided in each of the inner slits 4. According to this embodiement, since the outer slits 3 have larger widths, claw plates 11 can be loosely disposed in the slits 3 without any interference with the movement of the ring. This ring D is, therefore, advantageously adapted to the rotary member of a harder material.

The ring D shown in FIG. 5 has the same construction, operation, and effect as that of FIG. 4, with the exception of the arrangement of the holes 5. The holes 5 are equiangularly arranged in six directions in FIG. 5. The actuating projections 6 with holes 5 and the actuating projections 6 with no hole are alternatively arranged. Since the actuating projections 6 which include no hole are superior in their rigidity to the actuating projections 6 which include the holes 5, the rigidity of the ring D shown in FIG. 5 increases in comparison with that of the ring D shown in FIG. 4, and the force acting on the shaft to mount the rotary member thereto also increases, resulting in increase of the transmissibility of the rotating torque of the shaft.

The ring D shown in FIG. 6 is provided with the actuating projections 6 which include the inner slits 4 and the actuating projections 6 which include no inner slit. The two kinds of actuating projections are alternately arranged. The through holes 5 are provided only in the actuating projections 6 with no inner slit. Accordingly, the rigidity of the ring D shown in FIG. 6 is also very high.

As can be seen from the above discussion, according to the present invention, there is provided a ring which can rapidly and reliably mount a rotary member to a shaft with the help of connecting rods extending through holes in the ring and which can achieve a highly precise centering on the shaft. Furthermore, the ring according to the present invention can be easily disposed in place by the fastening operation of the connecting rods. The mounting force produced by the fastening force of the connecting rods is fifteen to twenty times as strong as the fastening force, i.e., the axial thrust load. The absolute mounting force can be adjusted by the number of rings which are to be superimposed, one on another. According to the present invention, a fewer number of parts is necessary, and the machine in which the rings are incorporated is small and light. Mounting and dismounting of the ring can be readily effected, so that the assemblage of the machine and the exchange of parts of the machine can be easily and inexpensively effected. The object of the invention can thus be achieved.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A ring member which is adapted to be disposed in an opening of a rotary member for coaxially mounting said rotary member to a shaft member which comprises a substantially convex ring body containing a centrally disposed hole, said ring body containing a plurality of outer slits which extend radially inwardly from the outer peripheral edge of the ring body toward the centrally disposed hole, a plurality of inner slits which radially extend outwardly from the edge defining the centrally disposed hole toward the outer peripheral edge of the ring body, and a plurality of through holes disposed in said ring body, said through holes being adapted to receive connecting rods for mounting the rotary member to said shaft member.

2. The ring member of claim 1, wherein the outer slits comprise substantially parallel sides which define a slit of narrow width, with the adjacent slits defining therebetween sector-shaped actuating projections which progressively increase in width toward the outer peripheral edge of the ring body.

3. The ring member of claim 2, wherein the inner slits enlarge into complementary sector-shaped apertures disposed within said sector-shaped actuating projections.

4. The ring member of claim 3, wherein the inner slits comprise parallel sides which define a slit of narrow width, said slit enlarging toward the peripheral edge of the ring body into said complementary sector-shaped apertures.

5. The ring member of claim 4, wherein the through holes are disposed in all of the narrow width portions of the inner slits.

6. The ring member of claim 4, wherein the through holes are disposed in only a portion of the narrow width portions of the inner slits.

7. The ring member of claim 4, wherein the through holes are disposed in the ring body adjacent to the narrow width portions of the inner slits.

8. The ring member of claim 1, wherein each of the outer slits has the form of a sector and each of the actuating projections diaposed between said outer slits has an elongated shape with substantially parallel sides.

9. The ring member of claim 8, wherein each of the inner slits has substantially parallel sides which define a slit of narrow width, said slits extending into a least one of said actuating projections.

10. The ring member of claim 9, wherein an inner slit is provided for each of said actuating projections and through holes are provided in all of the adjacent actuating projections.

11. The ring member of claim 9, wherein an inner slit is provided for each of said actuating projections and through holes are provided in only some of said actuating projections.

12. The ring member of claim 9, wherein and inner slit is provided for only some of said actuating projections and through holes are provided for only some of said actuating projections.

13. The ring member of claim 12, wherein the inner slits and the through holes are provided for different actuating projections.

14. A coaxially mounted rotary member which comprises a shaft assembly, said rotary member concentrically disposed about said shaft assembly, ring members disposed on both sides of said rotary member, said ring member disengageably fitted to the rotary member and the shaft assembly and connecting rods for mounting the rotary members to said shaft assembly, each of said ring members comprising a substantially convex ring body containing a centrally disposed hole, said ring body containing a plurality of outer slits which extend radially inwardly from the outer peripheral edge of the ring body toward the centrally disposed hole, a plurality of inner slits which radially extend outwardly from the edge defining the centrally disposed hole toward the outer peripheral edge of the ring body, and a plurality of through holes disposed in said ring body, said through holes being adapted to receive said connecting rods for mounting the rotary member to said shaft member.

15. The ring member of claim 14, wherein the ring members are fitted into openings provided in the rotary member, said openings containing stepped abutment portions for engagement with said ring member.

16. The ring member of claim 14, wherein the rotary member is a drum, idle pulley, or a cylindrical gear.

* * * * *